(12) United States Patent
Fitz et al.

(10) Patent No.: US 6,615,965 B2
(45) Date of Patent: Sep. 9, 2003

(54) PLANAR OVER-RUNNING CLUTCH AND METHOD

(75) Inventors: Frank A. Fitz, Poway, CA (US); Wayne K. Higashi, Los Gatos, CA (US); Paul B Pires, Ben Lomond, CA (US)

(73) Assignee: EPX, L.P., Los Gatos, CA (US)

( * ) Notice: Subject to any disclaimer, the term of this patent is extended or adjusted under 35 U.S.C. 154(b) by 0 days.

(21) Appl. No.: 09/859,743

(22) Filed: May 18, 2001

(65) Prior Publication Data
US 2002/0170796 A1 Nov. 21, 2002

(51) Int. Cl.⁷ ................................................ F16D 41/12
(52) U.S. Cl. ...................... 192/46; 192/69.1; 192/106 R
(58) Field of Search .................... 192/46, 45.1, 69.1, 192/106 R; 74/576

(56) References Cited

U.S. PATENT DOCUMENTS

| | | | |
|---|---|---|---|
| 5,070,978 A | * 12/1991 | Pires | 192/45.1 |
| 5,597,057 A | * 1/1997 | Ruth et al. | 192/45.1 |
| 5,918,715 A | * 7/1999 | Ruth et al. | 192/46 |
| 6,116,394 A | * 9/2000 | Ruth | 192/46 |
| 6,129,190 A | * 10/2000 | Reed et al. | 192/46 |
| 6,186,299 B1 | * 2/2001 | Ruth | 192/46 |
| 6,244,965 B1 | * 6/2001 | Klecker et al. | 192/69.1 |
| 6,481,551 B1 | * 11/2002 | Ruth | 192/46 |

* cited by examiner

Primary Examiner—Rodney H. Bonck
(74) Attorney, Agent, or Firm—Stephen C. Shear

(57) ABSTRACT

A planar type of over-running clutch including first and second confronting plates is disclosed herein. The second plate itself includes movable struts and associated biasing mechanisms for cooperative engagement with cooperating shoulder members of the first plate under certain circumstances. An arrangement forming part of the second plate and part of each strut cooperates with the biasing mechanism of the second plate for preventing any contact between the struts and the first plate when the second plate rotates in a particular way.

14 Claims, 4 Drawing Sheets

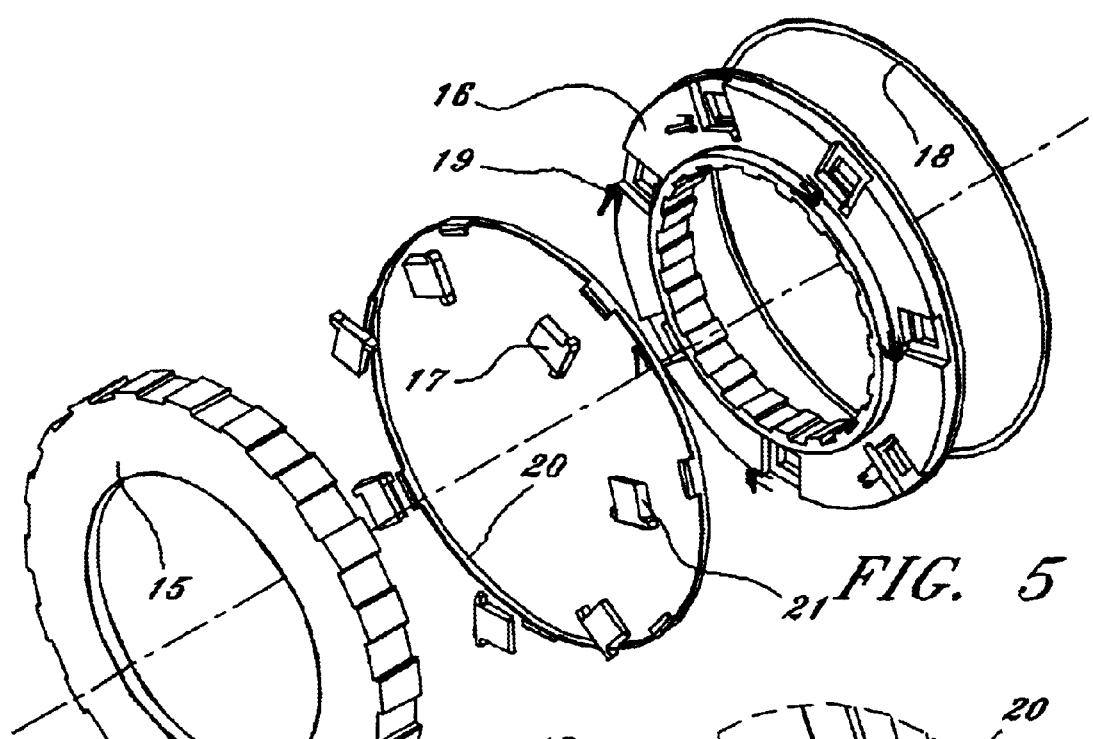
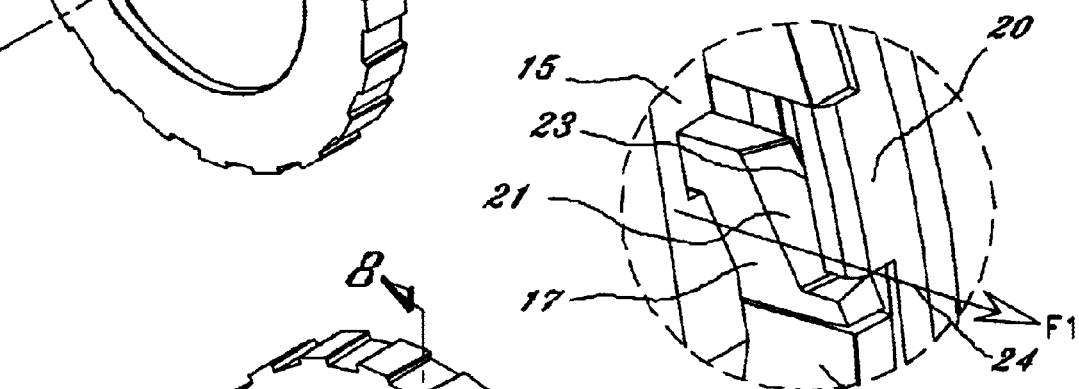
FIG. 5
FIG. 7
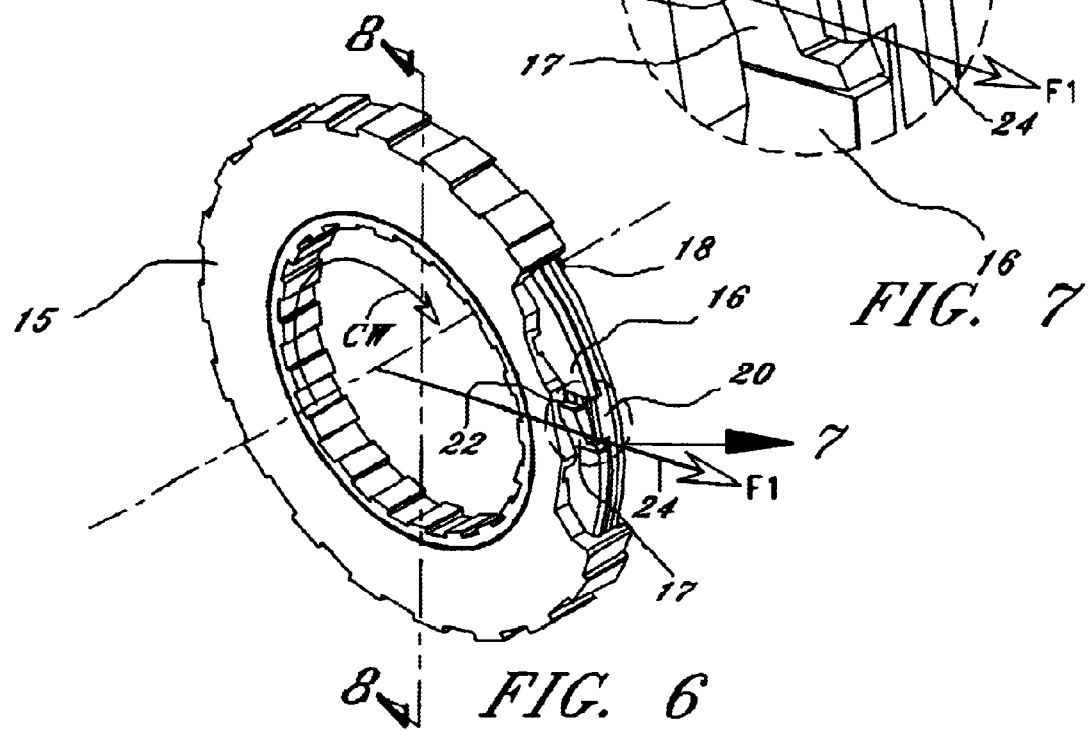
FIG. 6

$F2 = F1 * TAN (ALPHA)$

PLANAR OVER-RUNNING CLUTCH AND METHOD

BACKGROUND OF THE INVENTION

This invention relates to one-way clutches, which are common components in rotary mechanical power transmission systems. More specifically, the invention is an improvement on the planar "strut" type of one-way clutch as first seen in U.S. Pat. No. 5,070,978 and subsequent improvements sold under the Trademark, "Mechanical Diode" (TM).

One-way clutches or OWC's as they are commonly known provide a variety of different functions in rotary power transmission systems such as safety devices for helicopter auto-rotation, hold-backs for conveyor systems and as shift components in automotive transmissions to name a few.

All OWC's including the planar type, require significant lubrication in high-speed applications to prevent wear and damage due to friction. The presence of fluid is more critical in the planar type of OWC as the lubrication serves as an active component in stabilizing the behavior of the strut when overrunning in excess of the maximum dry speed. This speed varies according to the actual geometry of the clutch but has been experimentally established at ~2,000 RPM for the general example shown later in this discussion. In very high speed applications, all OWC's require a copious amount of lubricant flow to carry off waste heat generated as a consequence of fluid shear.

One problem currently not well addressed in all OWC's is in the rare occasions where system failure, contamination or momentary inertial forces cause a momentary cessation of lubricant flow. While damaging to all types of OWC's, this event can cause a rapid, catastrophic failure in a planar OWC.

In the example of helicopter auto-rotation this is very serious since the reason this safety feature might be needed is in the event of sudden loss of oil and the subsequent seizing of the engine and gear train.

Refinements have been made on the original strut geometry of planar OWC's that improve this situation so as to give a longer survivable time in an oil starved condition such as in U.S. Pat. No. 5,597,057 and U.S. Pat. No. 6,116,394. While this material shows an improvement, the techniques disclosed do not addrss the lack of stability of the strut but merely seek to restrain its resultant poor behavior. U.S. Pat. No. 6,116,394 describes the problem where unconstrained and deprived of fluid, the rear portion of the strut can enter the space of a notch and Impact with high force causing damage. U.S. Pat. No. 5,597,057 treats this by elongating the ears on the strut so that they protrude past the notch and will impact against the face of the notch plate rather than on a ramp of a notch. U.S. Pat. No. 6,116,394 shows a different strategy. It attempts to trap one edge of the strut between its pocket and the face of the notch plate so as to constrain its rotation in the event of oil loss.

In the particular case of an OWC with one member stationary and the other rotating, there is a simple solution that allows high-speed over running in the absence of fluid without strut failure. It is one purpose of this invention to show such a method.

Another purpose of this invention is to address the root cause of this failing in planar OWC design and remove the stimulus for bad behavior in those situations where the clutch is deprived of operating fluid. This is done by biasing the strut out of contact with the notch plate during overrun by utilizing the outward force generated by the strut carried by its pocket plate and to force a reaction with a cooperating feature on the pocket plate to counteract the bias of the engagement spring.

It is important to describe the sequence of events that cause catastrophic strut failure during high-speed, no-oil overrun in these prior art devices. FIG. 1 shows the general construction of a strut type planar clutch comprised of notch plate 7, pocket plate 2, strut 3 and spring 9. FIGS. 2 through 4 show sequential cross-sectional views of a single strut 3 according to the prior art during over run with no oil.

First, according to FIG. 2, the strut 3 is biased upward into a passing notch 10 by its spring 9. Next, the strut tip 11 is struck a glancing blow by the passing ramp of notch 10, imparting a rotational moment about the strut 3 center of mass and also generating a downward thrust to the strut 3. It is important to note that this initial impact is relatively small in magnitude. Now looking to FIG. 3, the strut impacts the bottom of its pocket 13, rebounding upward and pivoting about the point of contact as can be seen in FIG. 4. The rear of the strut 3 continues to rise into an adjacent notch 10. Finally, the rear of the strut 12 is struck smartly by that notch 10 ramp, imparting a large shock to the strut 3.

It is this last impact in the series that imparts the damaging forces and velocities to the strut 3. Since this last impact requires the strut 3 to be in an orientation contrary to the bias of the spring 9, it does not happen normally but only as a consequence of the entire sequence of FIGS. 2 to 4 as described above and only in the absence of surrounding fluid.

BRIEF DESCRIPTION OF THE DRAWINGS

FIG. 5 is an exploded perspective view showing the components of the invention.

FIG. 6 is a cutaway perspective view.

FIG. 7 is an enlarged detail of the area noted in FIG. 6.

DETAILED DESCRIPTION

Figure 1:
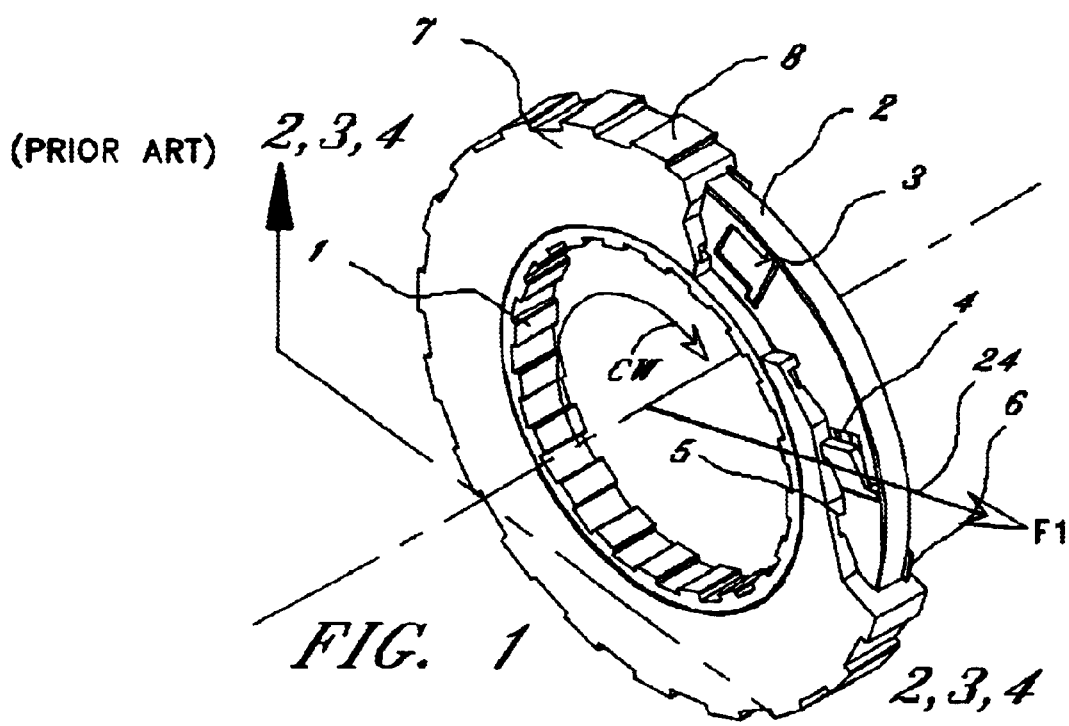
FIG. 1 is a cutaway perspective view of the prior art clutch.
Figure 2:
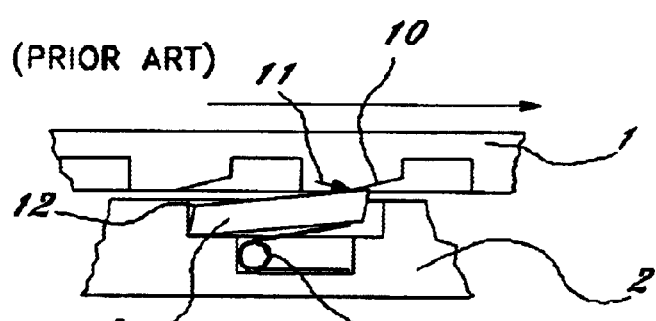
FIG. 2 is a cross section view of the prior art clutch taken along lines 2,3,4, of FIG. 1 approximately through the center of one strut and normal to centrifugal force acting on the strut.
Figure 3:
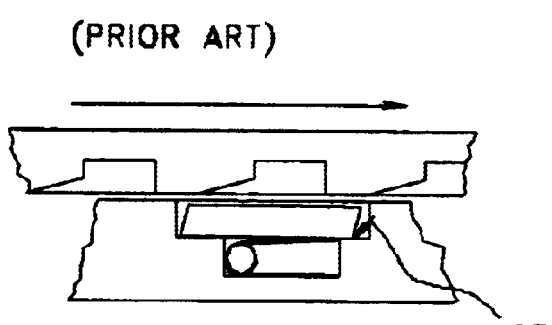
FIG. 3 is a similar view of the prior art clutch to FIG. 2 showing the components later in the sequence.
Figure 4:
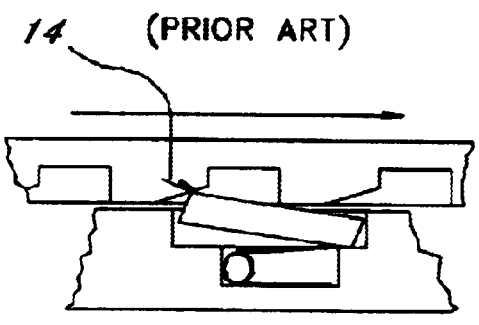
FIG. 4 is a similar view of the prior art clutch to FIG. 3 showing the components still later in the sequence.

FIG. 5 is an exploded view of the assembly consisting of notch plate 15, pocket plate 16, a plurality of struts 17 carried by the pocket plate 16, an outer strut support ring 20 and a retaining ring 18. FIG. 6 shows these components in their assembled configuration. FIG. 7 is an enlarged view of the cutaway portion showing the components in more detail.

Figure 8:
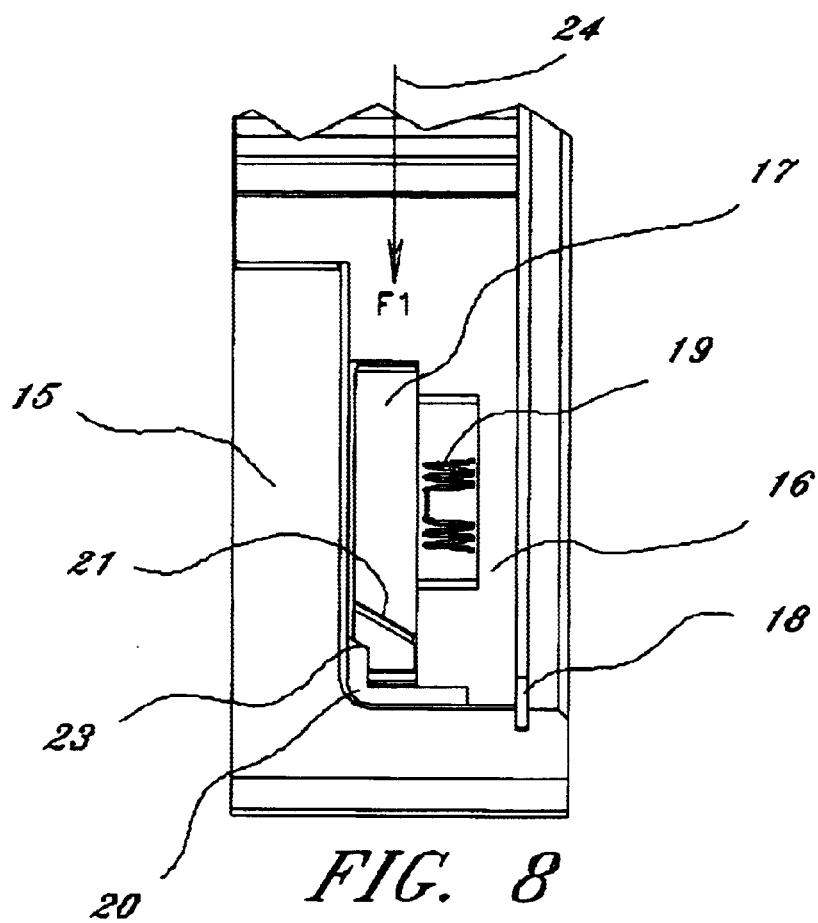
FIG. 8 is a side cutaway view corresponding to the lines 8—8 of FIG. 6 and sectioning one strut 17 parallel to the centrifugal force 24 (F1).

In operation, the outer component, the notch plate 15 is held stationary and the pocket plate 16 is connected to the desired element to be controlled. During over-run, the pocket plate 16 rotates clockwise, CW, in this example, and at high speed carrying the struts 17, which are forced outward by momentum, F1 indicated by the arrow 24 which is a function of the speed of rotation of the pocket plate 16. This force 24 pushes angled strut faces 21 against the angled surfaces 23 of the outer strut support 20 thereby generating a force perpendicular to force 24 and counter to the bias of the spring 19 as seen in FIG. 8 thus preventing the strut 17 from tilting away from its pocket 16 and towards the notch plate 15. When rotation of the pocket plate 16 exceeds a designed "sleep" speed, rotation of the strut 17 in any axis is inhibited by the forces generated by the cooperating angled strut edge 21 and the angled surface 23, thereby keeping the strut 17 out of contact with the notch plate 15.

At the point in time when the clutch is about to engage and lock (direction reversal), the rotational speed of the pocket plate 16 must match to the stationary notch plate 15 before reversing. Before this point is reached, the velocity drops below the calculated point of balance, the centrifugal force 24 on the strut 17 subsides and the spring 19 overcomes the forces generated by the angled surfaces 21 and 23. Once this speed threshold is crossed, the strut 17 then behaves normally e.g. as the prior art devices operate. This normal behavior is only allowed at velocities below the critical limiting speed for dry over-running. Above the sleep speed, the struts 17 are inhibited from interacting with the notch plate 15 in any way, regardless of fluid condition.

Figure 10:
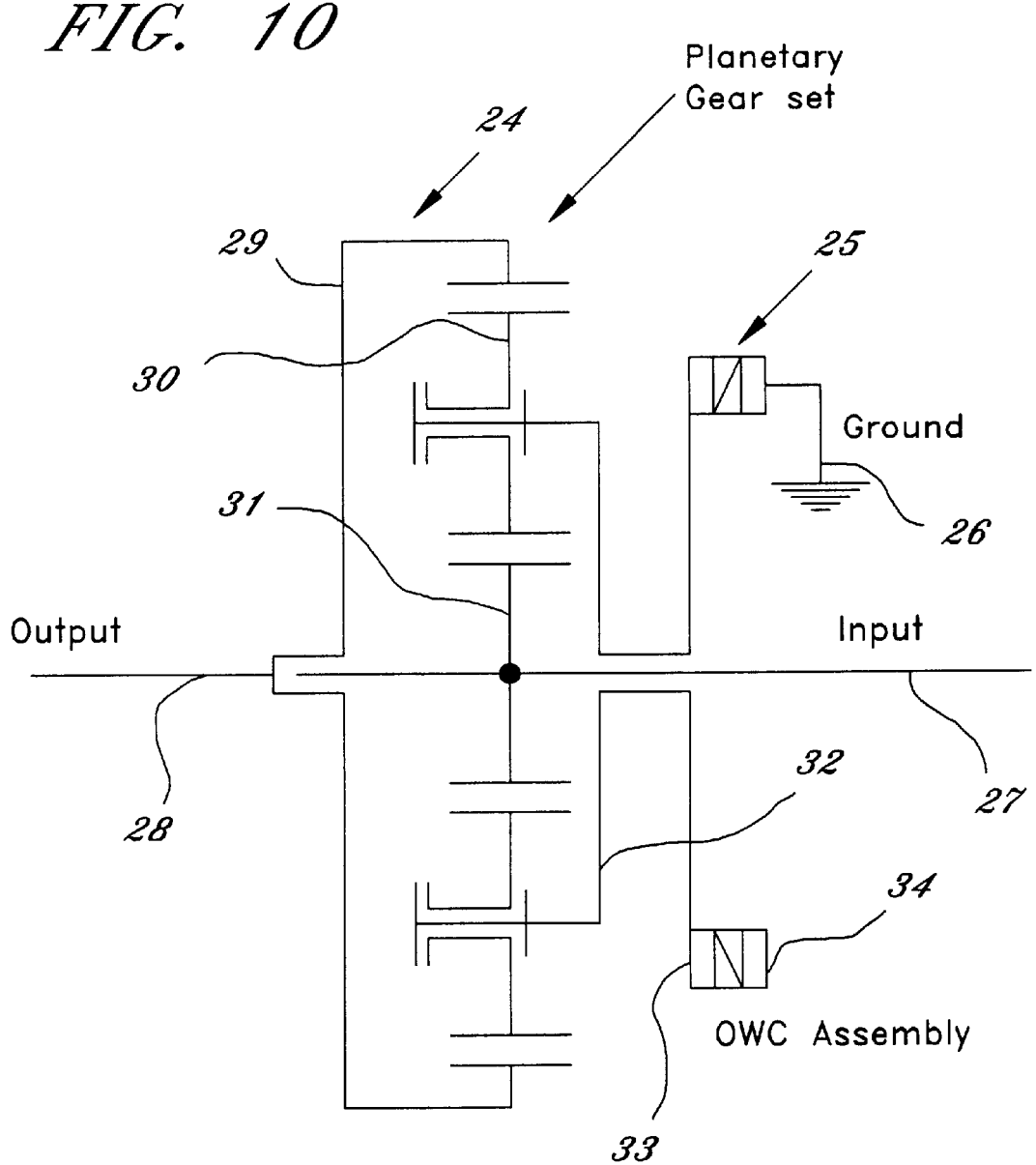
FIG. 10 is a schematic gear train diagram showing the proposed invention in its location in a typical application.

FIG. 10 is a schematic drawing showing an example of this OWC invention 25 in use in a typical application involving speed reduction using a generic planetary gear set PGS. In this example, input rotation 27 is present at the sun gear 31 of the generic planetary gear set PGS and the ring gear 29 becomes the output 28. This common application can only function if the planet gear carrier 32 is constrained from rotating e.g. "is grounded". Interposing the previously described OWC 25 between the planet carrier 32 and ground 26 will provide for an over-running output 28 that will function properly even in the intermittent absence of oil supply such as in the case desirable for Helicopter auto rotation.

When the input 27 is driving the output 28 at the designed ratio of the generic planetary gear set, the carrier 32 is forced in an absolute rotational direction e.g. relative to ground, similar to that rotational direction of the sun gear 31. Constraining the carrier 32 to not rotate in this direction, via the lock function of the OWC assembly 25, allows the generic planetary gear set to function and thereby drive the output 28 at the required ratio.

In the case where the input rotation 27 ceases, or in other general cases where output 28 over-running of the input 27 prescribed speed is desired, the output 28 is now pulling the input 27 rather than being pushed by it and therefore all forces in the assembly reverse. This force reversal urges the carrier 32 to rotate in a direction, relative to ground 26, opposite to the driving case above and the one-way clutch assembly 25 unlocks in response to this direction reversal allowing the free over-run of the output 28 at a velocity greater than that prescribed by the input 27.

As previously described, the grounded member of this OWC 25, is the notch plate 34, similar to that described as 15. The rotating member connected to the carrier 32 is the pocket plate previously described as 16. When the output 28 described above over-runs the input 27, the pocket plate 33 of OWC assembly 25 is forced to rotate, relative to ground 26, in its over-running direction. In the case where this rotational speed becomes too fast for safe, oil free, operation, the inventive features previously described come into play to inhibit contact of the orbiting struts carried by pocket plate 33 with the stationary notch plate 34.

Going back to FIG. 8, the strut 17 behavior is controlled as a function of the rotational speed of the pocket plate 16, which happens to be clockwise, CW, in this example. Different rotational directions or switching of the pocket plate 16 and notch plate 15 as inner and outer members are obvious and does not avoid the invention herein. Similarly, the notch plate 15 is not required to be stationary so long as the absolute velocity of the pocket plate 16 controls the behavior of the struts 17 within the bounds of an acceptable "dry" rotational speed difference between pocket plate 16 and notch plate 15 and as long as the point of relative rotation reversal between the two members allows an absolute pocket plate 16 rotational velocity below the sleep threshold.

Figure 9:
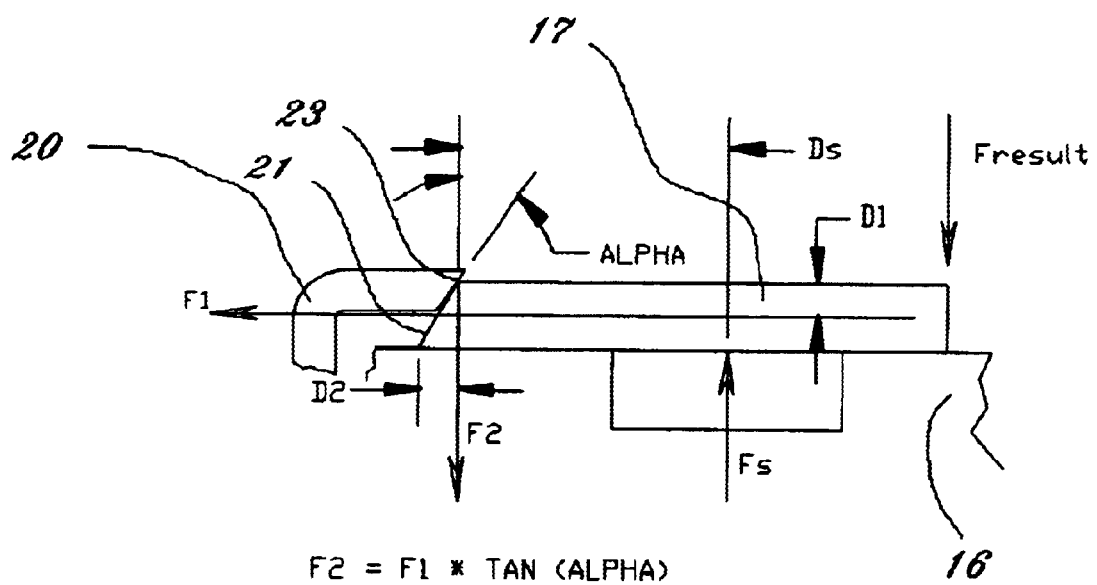
FIG. 9 is a sketch showing the forces and geometry of the embodiment.

As an actual example, a clutch having struts 17 radially positioned at 2.5 inches from the axis of rotation will retract its struts 17 and not interact with the stationary notch plate 15 at approximately 790 RPM speed of the pocket plate 16 if the geometry defined in FIG. 9 is used with a strut 17 mass of 0.08 ounces. This "sleep" speed can be tuned by varying the mass and geometiy of the strut 17, as well as the spring 19 force in accordance with the equation provided below and according to FIG. 9.

$$\omega^2 = \frac{(F_s D_s - F_2 D_2)g}{D_1 W r}$$

Where:
  ω—Clutch pocket plate angular velocity
  $F_s$—Spring force in the strut down position
  Ds—Distance from strut inner angled edge to spring force
  D1—One-half of the strut thickness
  $D_2$—Planar distance between the wedge side strut edges
  $F_2$—Cam down force exerted by the wedge
  W—Strut weight
  r—Distance from MD axis to strut center of mass
  g—Gravitational Constant

What is claimed is:

1. In a planar type of over-running clutch having a first plate including at least one strut engaging shoulder member and a confronting second plate carrying at least one strut movable in a direction towards and away from said first plate between a first position closer to the first plate and a second position further from the first plate and a biasing mechanism for biasing the strut in its first position, said first and second plates being configured such that (i) when said second plate is caused to rotate in one direction with respect to said first plate, said strut of the second plate engages a shoulder member of the first plate in a way that causes the second plate to lock into movement with the first plate, at the same speed of the first plate including the speed of zero if the first plate is stationary, and such that (ii) when the second plate is caused to rotate in the opposite direction with respect to the first plate, it does so without any such locked engagement with the first plate, so that the second plate can overrun with respect to said first plate, the improvement comprising:

an arrangement forming part of said second plate and part of said strut and cooperating with said biasing mechanism of said second plate so as to prevent any contact between the strut and the first plate with the strut in said second position under certain predetermined conditions such that said arrangement cooperates with said strut and said biasing mechanism so as automatically to cause the strut to move from a first location, such that the strut is able to move between said first and second positions, to a second location when said second plate rotates in said opposite direction at or above a given speed, and back to said first location when the speed of the second plate in said opposite direction drops below said given speed, said arrangement being configured such that when the strut is at said second location, the arrangement prevents the strut from moving to said biased first position from said second position at and above the given speed and in a way which urges the strut to move from said second location towards said first location below said given speed.

2. The improvement according to claim 1 wherein said given speed creates a centrifugal force sufficiently large to cause the strut to move from said first location to said second location at and above the given speed and wherein said arrangement is configured to produce a biasing force, which opposes said centrifugal force, by converting at least a portion of the force that is applied by said mechanism for biasing the strut in said first position into said biasing force such that the biasing force overcomes the centrifugal force below given speed.

3. The improvement according to claim 2 wherein said strut includes a first angled surface, forming one part of said arrangement, that is defined by an outward edge of said strut to engage a second angled surface, forming another part of said arrangement, that is defined by said second plate and said first and second angled surfaces are simultaneously urged against one another at and above said given speed by said centrifugal force and said force that is applied by said mechanism for biasing the strut into said first position.

4. The improvement according to claim 2 wherein said biasing force is at least generally perpendicular to the force that is applied by the mechanism for biasing the strut.

5. A planar type of over-running clutch, comprising
(a) a first plate including at least one strut engaging shoulder member;
(b) a second plate confronting said first plate and carrying at least one strut movable in a direction towards and away from said first plate between a first position closer to the first plate and a second position further from the first plate and a biasing mechanism for biasing the strut towards said first position, said first and second plates being configured such that (i) when said second plate is caused to rotate in one direction with respect to said first plate, said strut of the second plate engages a shoulder member of the first plate in a way that causes the second plate to lock into movement with the first plate, at the same speed of the latter plate including the speed of zero if the first plate is stationary, and such that (ii) when the second plate is caused to rotate in the opposite direction with respect to the first plate, it does so without any such locked engagement with the first plate, so that the second plate can overrun with respect to said first plate; and
(c) an arrangement forming part of said second plate and part of said strut and cooperating with said biasing mechanism of said second plate so as to prevent any contact between the strut and the first plate with the strut in said second position when said second plate rotates in said opposite direction at or above a given speed and said arrangement further cooperates with said strut and said biasing mechanism so as automatically to cause the strut to move from a first location, such that the strut is able to move between its first and second positions, to a second location when said second plate rotates in said opposite direction at or above said given speed, and back to said first location when the speed of the second plate in said opposite direction drops below said given speed, said arrangement being configured such that when the strut is at said second location, the arrangement prevents the strut from moving to said biased first position from said second position at and above the given speed and in a way which urges the strut to move from said second location toward said first location below said given speed.

6. A planar type of over-running clutch, comprising
(a) a first plate including at least one strut engaging shoulder member;
(b) a second plate confronting said first plate and carrying at least one strut movable in a direction towards and away from said first plate between a first position closer to the first plate and a second position further from the first plate and a biasing mechanism for biasing the strut towards said first position, said first and second plates being configured such that (i) when said second plate is caused to rotate in one direction with respect to said first plate, said strut of the second plate engages a shoulder member of the first plate in a way that causes the second plate to lock into movement with the first plate, at the same speed of the latter plate including the speed of zero if the first plate is stationary, and such that (ii) when the second plate is caused to rotate in the opposite direction with respect to the first plate, it does so without any such locked engagement with the first plate, so that the second plate can overrun with respect to said first plate; and
(c) an arrangement forming part of said second plate and part of said strut and cooperating with said biasing mechanism of said second plate so as to prevent any contact between the strut and the first plate with the strut in said second position when said second plate rotates in said opposite direction at or above a given speed which creates a centrifugal force sufficiently large to cause the strut to move from said first location to said second location at and above the given speed and wherein said arrangement is configured to produce a biasing force, which opposes said centrifugal force, by converting at least a portion of the force that is applied by said mechanism for biasing the strut in said first position into said biasing force such that the biasing force overcomes the centrifugal force below said given speed.

7. A planar type over-running clutch according to claim 6 wherein said biasing force is at least generally perpendicular to the force that is applied by the mechanism for biasing the strut.

8. A planar type of over-running clutch, comprising
(a) a first plate including at least one strut engaging shoulder member;
(b) a second plate confronting said first plate and carrying at least one strut movable in a direction towards and away from said first plate between a first position closer to the first plate and a second position further from the first plate and a mechanism for biasing the strut towards said first position, said first and second plates being configured such that (i) when said second plate is caused to rotate in one direction with respect to said first plate, the strut of the second plate engages a shoulder member of the first plate in a way that causes the second plate to lock into movement with the first plate, at the same speed of the latter plate including the speed of zero if the first plate is stationary, and such that (ii) when the second plate is caused to rotate in the opposite direction with respect to the first plate, the first plate does so without any such locked engagement with the first plate, so that the second plate can overrun with respect to said first plate; and (c) means forming part of said second plate and part of said strut and cooperating with said biasing mechanism of said second plate for preventing the strut from contacting the first plate with the strut in said second position when said second plate rotates in said opposite direction at or above a given speed and said means automatically causes the strut to move from a first location, such that the strut is able to move between its first and second positions, to a second location when said second plate rotates in said opposite direction at or above said given speed, and back to said first location when the speed of the second plate in said opposite direction drops below said given speed, said arrangement being configured such that when the strut is at said second location, the arrangement prevents the strut from moving to said biased first position from said second position at and above said given speed and in a way which urges the strut to move from said second location to said first location below said given speed.

9. A planar type of over-running clutch, comprising (a) a first plate including at least one strut engaging shoulder member;

(b) a second plate confronting said first plate and carrying at least one strut movable in a direction towards and away from said first plate between a first position closer to the first plate and a second position further from the first plate and a biasing mechanism for biasing the strut towards said first position, said first and second plates being configured such that (i) when said second plate is caused to rotate in one direction with respect to said first plate, said strut of the second plate engages a shoulder member of the first plate in a way that causes the second plate to lock into movement with the first plate, at the same speed of the latter plate including the speed of zero if the first plate is stationary, and such that (ii) when the second plate is caused to rotate in the opposite direction with respect to the first plate, it does so without any such locked engagement with the first plate, so that the second plate can overrun with respect to said first plate; and (c) an arrangement forming part of said second plate and part of said strut and cooperating with said biasing mechanism of said second plate so as to prevent any contact between the strut and the first plate with the strut in said second position when said second plate rotates in said opposite direction at or above a given speed which creates a centrifugal force sufficiently large to cause the strut to move from said first location to said second location at and above the given speed and wherein said arrangement is configured to produce a biasing force, which opposes said centrifugal force, by converting at least a portion of the force that is applied by said mechanism for biasing the strut in said first position into said biasing force such that the biasing force overcomes the centrifugal force below said given speed.

10. A planar type over-running clutch according to claim 9 wherein said strut includes a first angled surface, forming one part of said arrangement, that is defined by an outward edge of said strut to engage a second angled surface, forming another part of said arrangement, that is defined by said second plate and said first and second angled surfaces are simultaneously urged against one another at and above said given speed by said centrifugal force and said force that is applied by said mechanism for biasing the strut into said first position.

11. A planar type over-running clutch according to claim 9 wherein said biasing force is at least generally perpendicular to the force that is applied by the mechanism for biasing the strut.

12. In a method of operating a planar type of over-running clutch having a first plate including at least one strut engaging shoulder member and a confronting second plate carrying at least one strut movable in a direction towards and away from said first plate between a first position closer to the first plate and a second position further from the first plate and a mechanism for biasing the strut towards said first position, said first and second plates being configured such that (i) when said second plate is caused to rotate in one direction with respect to said first plate, said strut of the second plate engages a shoulder member of the first plate in a way that causes the second plate to lock into movement with the first plate, at the same speed of the first plate including the speed of zero if the first plate is stationary, and such that (ii) when the second plate is caused to rotate in the opposite direction with respect to the first plate, it does so without any such locked engagement with the first plate, so that the second plate can overrun with respect to said first plate, the method comprising the steps of:

automatically preventing the strut from moving to its biased first position from its second position when said second plate rotates in said opposite direction at or above a given speed in a way which prevents any contact between the strut and the first plate under certain predetermined operating conditions by automatically causing the strut to move from a first location, such that the strut is able to move between its first and second positions, to a second location when said second plate rotates in said opposite direction at or above said given speed, and back to said first location when the speed of the second plate in said opposite direction drops below said given speed, and configuring said arrangement such that when the strut is at said second location, the arrangement prevents the strut from moving to said biased first position from said second position in a way which urges the strut to move from said second location toward said first location below said given speed.

13. A method according to claim 12 wherein said given speed creates a centrifugal force sufficiently large to cause the strut to move from said first location to said second location at and above the given speed and including the step of using said arrangement to convert a portion of the force that is applied by said mechanism, for biasing the strut towards said first position, into a biasing force which opposes said centrifugal force such that the biasing force overcomes the centrifugal force below said given speed.

14. A method according to claim 13 including the step of arranging said biasing force at least generally perpendicular to the force that is applied by the mechanism for biasing the strut.

* * * * *